United States Patent [19]

Nakamura et al.

[11] Patent Number: 4,821,567

[45] Date of Patent: Apr. 18, 1989

[54] RUNNING SPEED DETECTING DEVICE FOR MARINE VESSELS

[75] Inventors: Tomoji Nakamura; Ryoji Sawada, both of Iwata; Kazuhiro Nakamura, Hamamatsu, all of Japan

[73] Assignees: Sanshin Kogyo Kabushiki Kaisha; Yamaha Hatsudoki Kabushiki Kaisha, Hamamatsu, Japan

[21] Appl. No.: 162,734

[22] Filed: Mar. 1, 1988

[30] Foreign Application Priority Data

Mar. 2, 1987 [JP] Japan .................................. 62-45364

[51] Int. Cl.$^4$ ............................................. G01C 21/10
[52] U.S. Cl. ................................................... 73/182
[58] Field of Search ........................................... 73/182

[56] References Cited

U.S. PATENT DOCUMENTS

| | | | |
|---|---|---|---|
| 1,869,974 | 8/1932 | Masters | 73/182 |
| 2,627,181 | 2/1953 | Kiekhaefer | 73/182 |
| 3,210,995 | 10/1965 | Kiekhaefer | 73/182 |
| 4,205,552 | 6/1980 | Refoy | 73/182 |
| 4,694,694 | 9/1987 | Vlakanicic et al. | 73/721 |

Primary Examiner—Stewart J. Levy
Assistant Examiner—Joseph W. Roskos
Attorney, Agent, or Firm—Ernest A. Beutler

[57] ABSTRACT

An improved running speed detecting device for a watercraft wherein the speed signal is derived from a water pressure signal. The water pressure signal is transmitted to a voltage signal at different amplification factors at different running speeds so as to provide a greater degree of accuracy throughout the watercraft speed ranges.

6 Claims, 4 Drawing Sheets

RUNNING SPEED DETECTING DEVICE FOR MARINE VESSELS

BACKGROUND OF THE INVENTION

This invention relates to a running speed detecting device for marine vessels and more particularly to an improved, simplified and highly effective arrangement for indicating the speed of a watercraft that is accurate over a wide range of speeds.

There are a number of types of speed indicators employed for watercraft. These devices all operate on electrical principles and include either the propeller type wherein a propeller is mounted on the hull and rotates at a speed which will be related to the speed of the hull or of the magnetic current meter type. Such magnetic current meter type devices also are provided on the exterior of the hull and each system requires the provision of connecting wires for transmitting a signal from the sensor to a remotely positioned indicator. However, the accuracy of such devices depends on the effectiveness of the transmission of the electrical signal from the remotely positioned speed transducer to the speed indicator positioned in proximity to the watercraft operator. As a result, these devices tend to be inaccurate.

In order to improve the accuracy of watercraft speed indicators and in order to permit a device that can be used with a wide variety of watercraft, it has been proposed to utilize the water pressure as an indicator of speed. To this end, the hull is provided with a forwardly facing opening that receives the water pressure which will be dependent upon the speed of watercraft travel. A conduit then conveys the water pressure from the opening to a remotely positioned speed indicating device that incorporates a pressure transducer that outputs a signal indicative of water pressure. A converter circuit then converts this water pressure signal into a speed signal. An arrangement of this type is shown in the copending application entitled "Speedometer For Marine Vessels", Ser. No. 160,124, filed Feb. 25, 1988 in the name of Kazuhiro Nakahmma et al, which application is assigned to the assignees of this application.

Although the arrangement described in the aforenoted copending application is extremely effective in meeting its desired objects, still further improvement is possible. One difficulty with the type of device shown in that appliction is that at low speeds, the water pressure variation is such that it is difficult to obtain accurate speed readings. The reason for this is that at low speeds the pressure variation in response to speed variation is not that great and the difference in speed in relation to pressure does not offer the degree of resolution that is desirable for good performance.

It is, therefore, a principal object of this invention to provide a running speed detecting device for marine vessels that will provide an accurate signal of speed under a wide range of running conditions.

It is a further object of this invention to provide a running speed detecting device for a watercraft that will provide an accurate speed signal under all conditions.

SUMMARY OF THE INVENTION

This invention is adapted to be embodied in a running speed detector for a watercraft that is comprised of a hull. Means are carried by the hull and define an opening to receive water pressure generated by the movement of the hull through the water. Conduit means transmit the water pressure from the opening to a remote position at which a combined sensor, indicator element is located. The combined sensor, indicator element is comprised of a first means for providing an output signal in proportion to pressure of a first predetermined relationship. Second means are also incorporated that provide an output signal in proportion to pressure in a second predetermined relationship. Processing means select a respective one of the signals in a first range and the other one of the signals in another range to provide a signal indicative of speed from the sensed pressure signal.

DETAILED DESCRIPTION OF THE PREFERRED EMBODIMENTS

Figure 1:
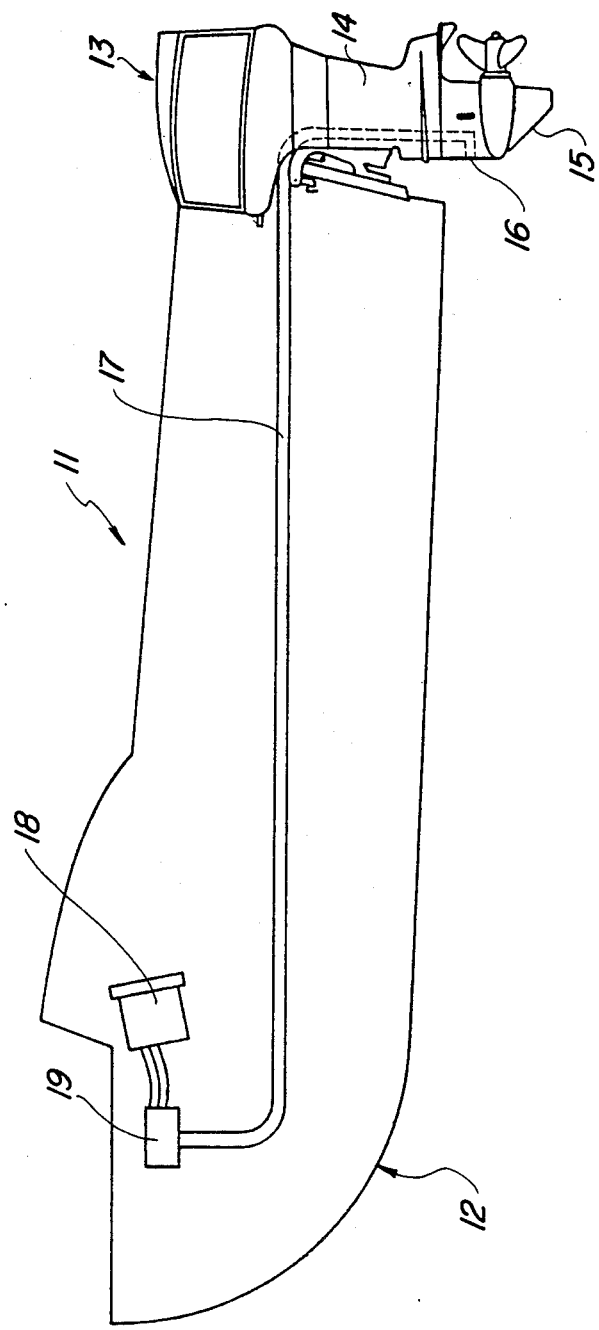
FIG. 1 is a side elevational view of a watercraft incorporating a running speed detector constructed in accordance with an embodiment of the invention.

Referring first to FIG. 1, a watercraft constructed in accordance with an embodiment of the invention is identified generally by the reference numeral 11. The watercraft 11 is comprised of a hull indicated generally by the reference numeral 12 and which is propelled by an outboard motor, indicated by the reference numeral 13. The outboard motor 13 includes a drive shaft housing 14 which has a lower unit 15 in which a forwardly facing opening 16 is formed.

A conduit 17 is provided for transmitting a water pressure signal from the opening 16 to a combined pressure transducer, speed indicator mechanism, indicated generally by the reference numeral 18. The speed indicator 18 is positioned in the passenger cabin of the watercraft 11 in proximity to the operator for indicating watercraft speed to the operator. A pressure sensor device 19 provides a voltage signal indicative of pressure and transmits this signal to the speed indicator 18 for processing therein in a manner to be described.

Basically, the speed indicator device 18 may have the construction as shown in the aforenoted copending application Ser. No. 160,124. However, the system as shown in that appliction has certain disadvantages in providing an accurate output signal under all running conditions and the reason for this may be best understood by reference to FIG. 2.

Figure 2:
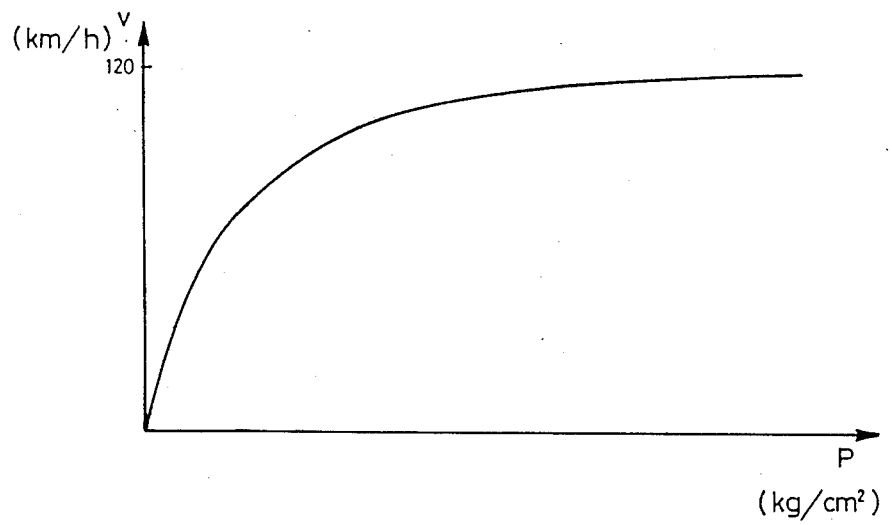
FIG. 2 is a graphical view showing the relationship between sensed pressure and velocity.

FIG. 2 is a graph showing the relationship between pressure at the opening 16 or at a pressure transducer and speed. This curve is based upon a typical arrangement embodying a pressure transducer, converter circuit and display circuit as shown in the aforenoted copending application. It will be noted that at low pressures, there is a significant difference in the velocity for small pressure changes and the shape of the curve in this range gives rise to poor resolution of the analog digital computer employed in the arrangement under these circumstances. Thus, the speed signal may become inaccurate under low speed and low pressure conditions.

Figure 3:
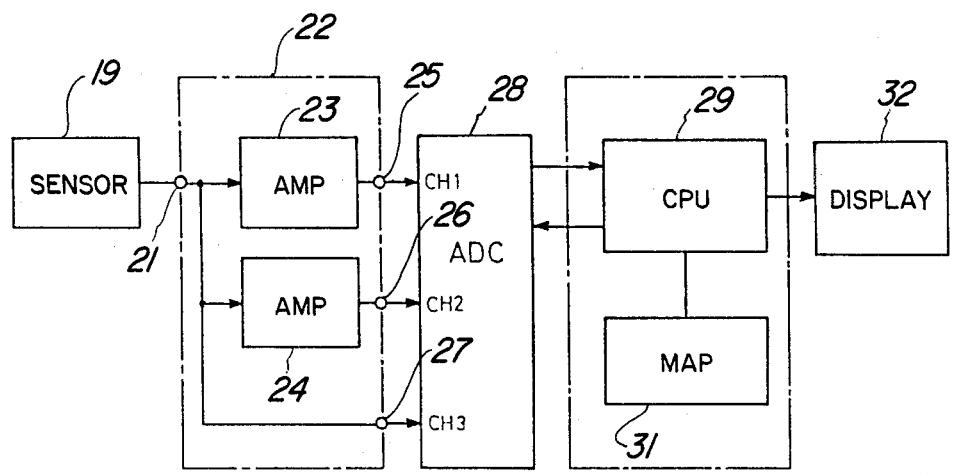
FIG. 3 is a schematic view showing the components and system of a first embodiment of the present invention.
Figure 4:
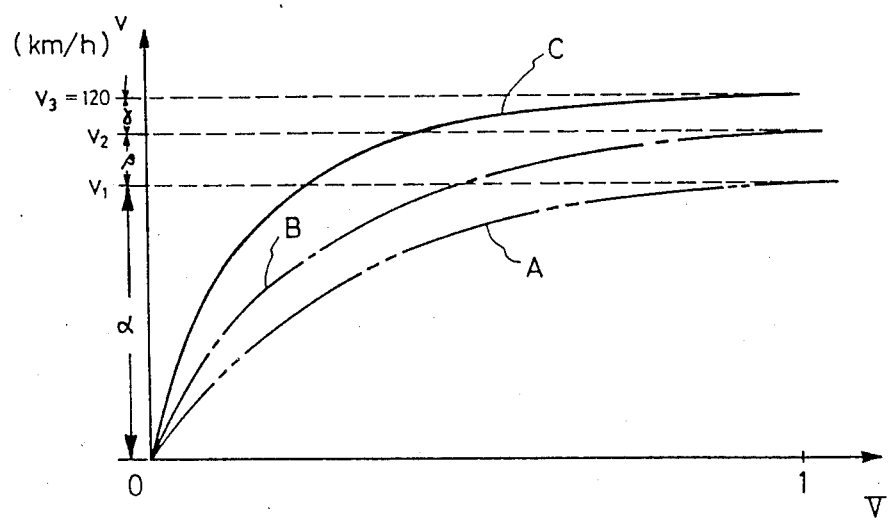
FIG. 4 is a graphical view showing how this embodiment operates in order to achieve greater accuracy.

In accordance with the invention, an arrangement is incorporated so as to avoid this result and this construction is shown in FIG. 3 while FIG. 4 is a graphical view showing how the device is operated to improve the resolution under all speeds. As may be seen in FIG. 3, the semiconductor pressure sensing device 19 outputs its pressure signal in the form of a voltage signal to a terminal 21 of am amplifier device 22. The amplifier device 22 has two amplification stages 23 and 24 which outputs signals to respective junctions 25 and 26. In addition, there is provided a channel which is unamplified and which outputs a signal to a junction 27. The junctions 25, 26 and 27 all input to respective channels CH1, CH2 and CH3 of an analog to digital converter (ADC) 28. It should be noted that the amplifier phases 23 and 24 have different amplification curves so as to provide a different amplification to the input signal from the junction 21. As an example, the amplified voltages at the terminal 25 may run in the range of 0 to 3 volts, those at the terminal 26 to be in the range of 0 to 2 volts and the direct output at the terminal 27 to be in the range of 0 to 1 volts.

The analog to digital computer 28 is controlled by a computer device 29 which, in turn, is provided with an internal map 31 that instructs it, in accordance with a program to be described, so as to provide the proper amplification signal to an indicator driver 32 that drives the LEDs of the indicator 18 so as to provide the speed indication.

FIG. 4 illustrates the relationship of the velocity to voltage signals provided for by the amplifier stages 23 and 24 and the direct output existent at the terminal 27. The voltage to velocity curve of the amplifier 23 is the curve A while that of the amplifier 24 is the curve B. The direct output is the curve C, which it can be seen is of the same shape as the curve in FIG. 2 showing the relationship between pressure and velocity. This is due to the fact that the pressure to voltage transducer 19 is a linear device. It will be seen that the speed with respect to output voltage of the amplifier A increases more steeply than that of the curves B and C.

The computer 29 selects the desired output from the analog to digital computer 28 from the amplifier stage 23 during the speed range $\alpha$ (0 to $V_1$) to as to provide a more accurate speed indication. When the speed $V_1$ is reached and during the range $\beta$ ($V_1$ to $V_2$), the output from the amplifier 24 at the terminal 26 is selected. When the speed $V_2$ is reached, the computer 29 selects the unamplified output at the terminal 27 so that the output will follow the curve C during the remaining speed range $\gamma$ ($V_2$ to $V_3$). Because of this, the device will operate to provide a much better signal.

Figure 5:
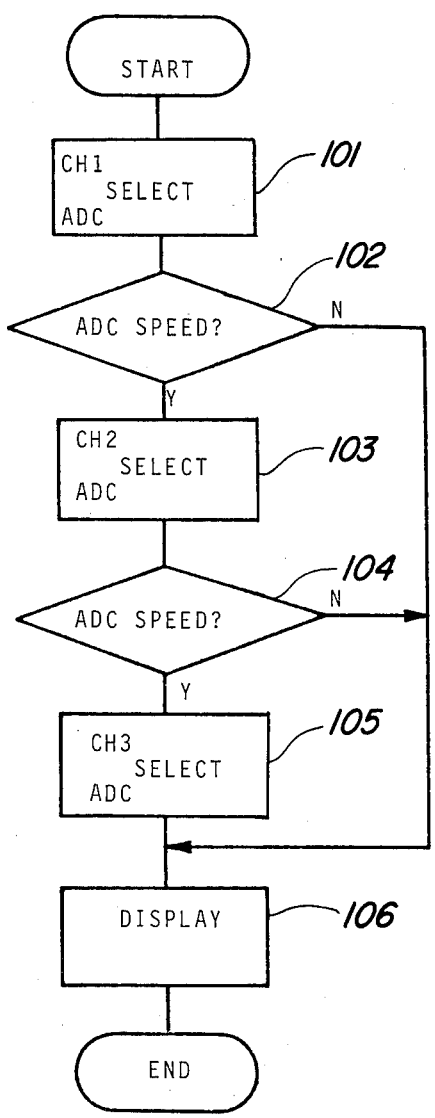
FIG. 5 is a schematic block diagram showing the processing steps of the computer.

The program by which the computer 29 operates is shown in FIG. 5. The program is started and then moves to the step 101 wherein the ADC is controlled so as to output the signal from the amplifier 23 at terminal 25 to the CPU 29. The CPU 29 then at the step 102 determines if the speed is outside of the range $\alpha$. If it is not, the program immediately moves to the step 106 where the output from the amplifier stage 23 is displayed at the display 32.

If, however, the speed range is outside of the range $\alpha$ (greater than $V_1$), the program moves to the step 103 where the output from the amplifier stage 24 at the terminal 26 is selected. It is then determined at the step 104 if the speed range is outside of the range $\beta$. If it is not, the program immediately moves to the display step 106 where the display 32 is illuminated by the output from the amplifier 24.

If, however, the output indicates that the velocity is greater than the range $\beta$ (greater than $V_2$), the CPU 29 at the step 105 selects the unamplified output from the terminal 27 for display purposes. Thus, it can be seen that the device provides the selected range of amplification depending upon the speed of the watercraft so as to provide a more accurate speed indication at all speeds.

Figure 6:
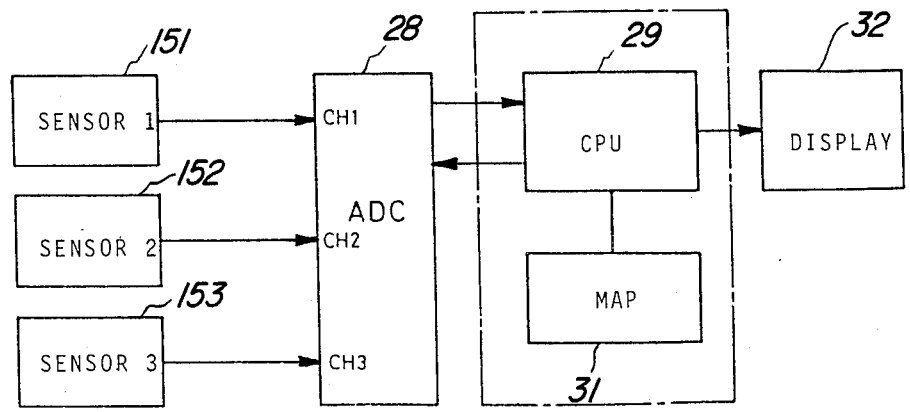
FIG. 6 is a schematic view, in part similar to FIG. 3, showing another embodiment of the invention.

In the embodiment of FIGS. 1 through 5, there was provided a single sensor device 19 and three different amplifier stages having different degrees of amplification. However, the invention may also be practiced in conjunction with an arrangement wherein sensors having different pressure to voltage signals are incorporated and FIG. 6 shows such an embodiment. In this embodiment, there are provided three pressure to voltage transducers 151, 152 and 153 each of which transmits their output signals to a respective channel CH1, CH2 and CH3 of the analog to digital converter 28. The pressure voltage transducer 151 provides a greater voltage output signal for a given pressure than does the pressure to voltage transducer 152. The sensor 152 provides a greater voltage output for a given pressure than does the sensor 153. As a result, the outputs of the sensors 151, 152 and 153 have voltage to velocity curves identical to the curves A, B and C of FIG. 4 provided for by the different amplification stages of the embodiment shown in FIG. 3.

The CPU and map 31 operate together with the analog to digital converter 28 in this embodiment in the same manner as shown in block diagram FIG. 5 so as to provide an accurate speed indication at all speeds.

From the foregoing description, it should be readily apparent that the described device provides an extremely good signal under all running conditions and thus provides a very good and simple speed indicator for a marine vessel. Although two embodiments of the invention have been illustrated and described, various changes and modifications may be made without departing from the spirit and scope of the invention, as defined by the appended claims.

We claim:

1. A running speed detector for a watercraft comprising a hull, means carried by said hull and defining an opening to receive water pressure generated by the movement of said hull through the water, conduit means for transmitting the water pressure from said opening to a remote position at which a combined sensor, indicator element is located, said combined sensor, indicator element being comprised of first means providing an output signal in proportion to pressure at a first predetermined relationship and second means for providing an output signal in proportion to pressure in a second predetermined relationship, and processing means for selecting a respective one of said signals in a first range and the other one of said signals in another range to provide a signal indicative of speed from the sensed pressure.

2. A running speed detector as set forth in claim 1 wherein the combined sensor, indicator element is comprised of a pressure to voltage sensor and the first means comprises a first amplifier stage and the second stage comprises a second amplifier stage.

3. A running speed detector as set forth in claim 1 wherein the first means comprises a first pressure to voltage transducer and the second means comprises a second pressure to voltage transducer.

4. A running speed detector as set forth in claim 1 wherein the combined sensor, indicator element further comprises third means for providing an output signal in proportion to pressure of a third predetermined relationship and the processing means selects the output from the third means to provide a signal at a third range.

5. A running speed detector as set forth in claim 4 wherein the combined sensor, indicator element is comprised of a pressure to voltage sensor and the first, second and third means comprise respective first, second and third amplifier stages.

6. A running speed detector as set forth in claim 4 wherein the first, second and third means comprise first, second and third pressure to voltage transducers.

* * * * *